Apr. 10, 1923.
T. A. BOYER
VEHICLE WHEEL
Filed Mar. 21, 1922
1,451,528
2 sheets-sheet 1
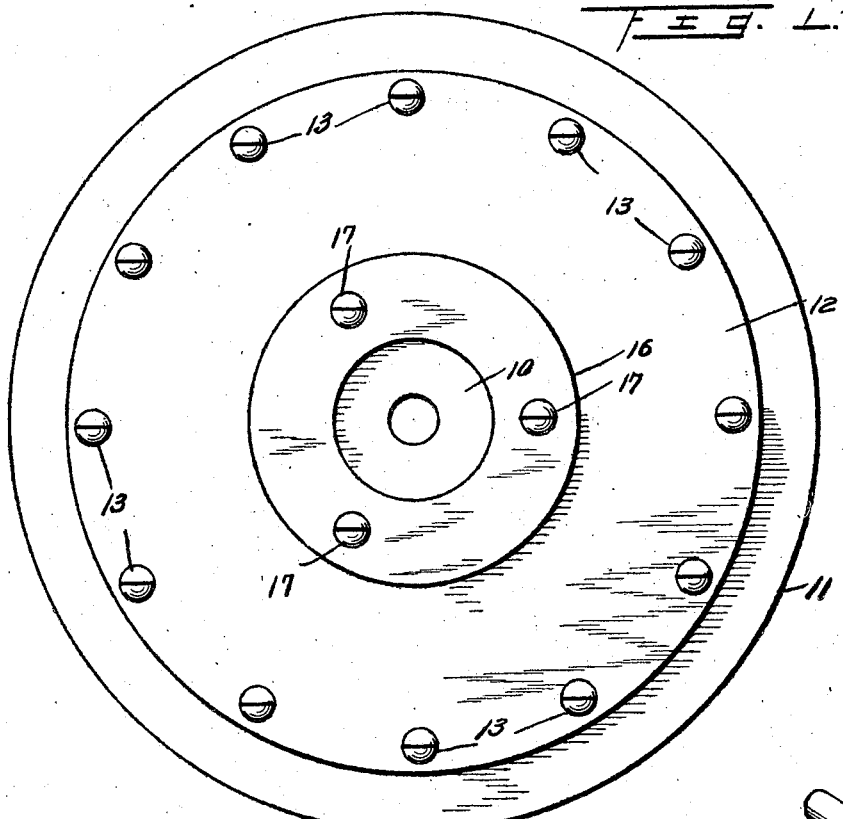
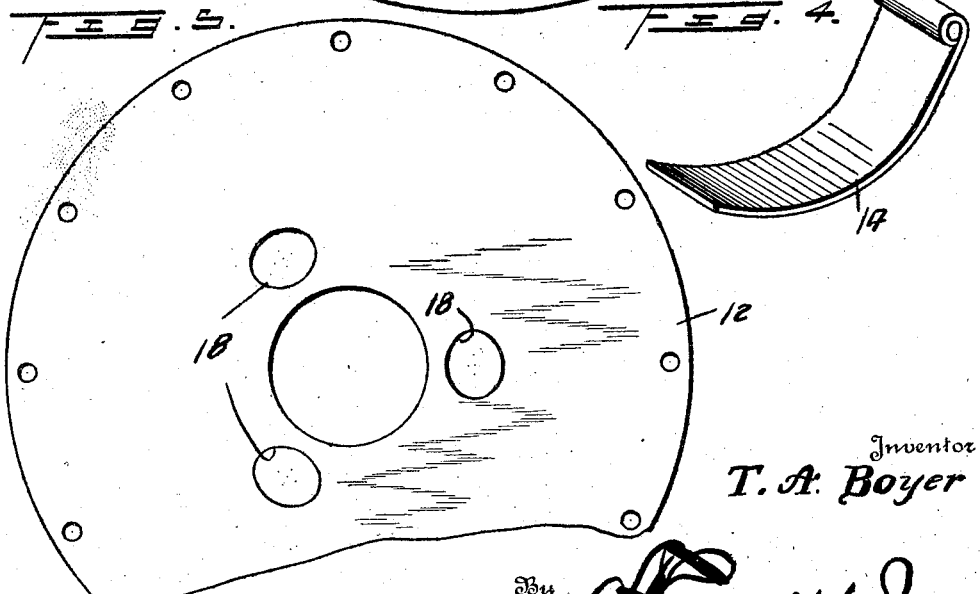
Inventor
T. A. Boyer
By
Attorney Apr. 10, 1923.
T. A. BOYER
1,451,528
VEHICLE WHEEL
Filed Mar. 21, 1922    2 sheets-sheet 2
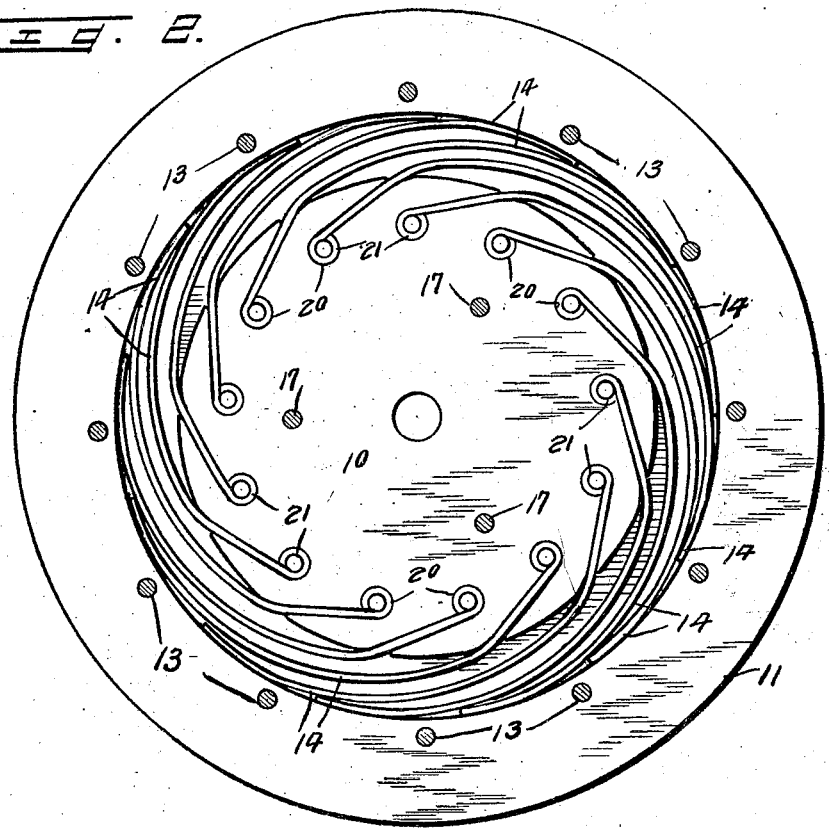
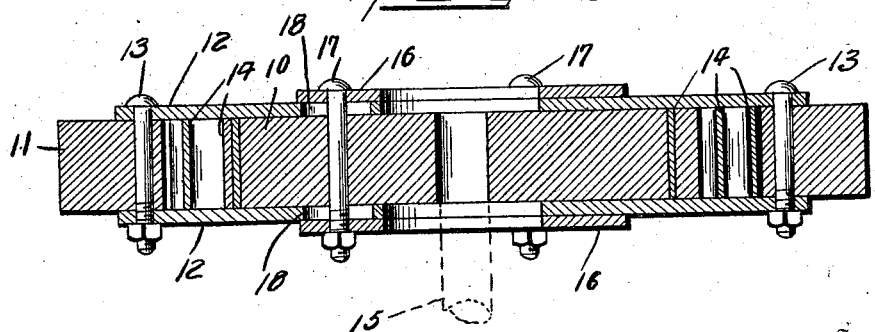
Inventor
T. A. Boyer Patented Apr. 10, 1923.

1,451,523

UNITED STATES PATENT OFFICE.

THOMAS A. BOYER, OF GAINESVILLE, TEXAS.

VEHICLE WHEEL.

Application filed March 21, 1922. Serial No. 545,441.

*To all whom it may concern:*

Be it known that I, THOMAS A. BOYER, a citizen of the United States, residing at Gainesville, in the county of Cooke and State of Texas, have invented certain new and useful Improvements in a Vehicle Wheel; and I do hereby declare the following to be a full, clear, and exact description of the invention, such as will enable others skilled in the art to which it appertains to make and use the same.

The object of the invention is to provide a yielding or cushioned wheel for vehicles and particularly motor driven vehicles as a substitute for the pneumatically tired vehicle wheels now in common use in connection with automobiles and the like, as a means of avoiding the disadvantages due to puncture and the rapid wearing and deterioration of tires of the conventional form or structure; and more particularly to provide a spring wheel of a stability adapted to withstand the strains to which vehicle wheels of the type indicated are subjected in use, and which at the same time will have the required resiliency to properly cushion shocks applied thereto in rapid movement of the vehicle; and with these objects in view the invention consists in the construction, combination and relation of parts of which a typical embodiment is illustrated in the accompanying drawings, wherein:—

Figure 1 is a side view of a wheel.

Figure 2 is a similar view with the side and top plates omitted.

Figure 3 is a transverse section.

Figure 4 is a detail view of one of the spring elements.

Figure 5 is a view of one of the side plates.

The wheel consists essentially of a core or hub member 10, a rim member 11 spaced from but normally arranged in concentric relation with the hub member, and side plates 12 which are carried by the rim member and are secured thereto by transverse bolts 13 extending entirely through the rim member and both side plates, and having a radial sliding engagement with the hub member or core 10 limited by interposed springs 14 of a special construction hereinafter more particularly described.

Arranged concentric with the axle 15 in overlapping relation with the side plates are hub plates 16 and in order that they may be secured in position and may at the same time hold the inner edges of the side plates in proper relation with the core or hub member, bolts 17 are extended transversely therethrough and through the core or hub member and said bolts pass through enlarged openings 18 in the side plates which permit of movement of the side plates with relation to the core or hub member without exposing the interior of the wheel or admitting dirt, dust or moisture thereto, by reason of the fact that the hub plates serve to completely cover the openings 18.

The rim may be of any preferred cross sectional construction and may be adapted to afford a seat for any desired or preferred construction of tire (not shown) or may at its outer periphery constitute the tire, the inner periphery preferably being smooth and cylindrical as indicated.

The springs by which the yielding spacing of the rim and core or hub member is affected are of the plate form curved on lines which are tangential to the core with their inner ends seated in the core and their free outer ends arranged in bearing contact with the inner periphery of the rim. In the construction illustrated the inner ends of the springs are fitted in tangentially disposed kerfs formed in the core or hub member and having their outlets at the periphery thereof, said kerfs terminating at their inner ends in rounded enlarged seats 20, and the inner ends of the springs, fitted in said kerfs are provided at their extremities with rolls 21 which engage the seats and thereby establish an interlocked relation between the springs and the core or hub member which provides against displacement relatively.

The springs may be inserted into their seats laterally of the core or hub member when one of the side plates has been removed, and obviously can be displaced in the same way for repair or substitution in the event of breakage or other injury, and when the side plates which are rigid with the rim are in place the lateral movement of the springs is prevented by reason of the fact that the springs are of a width corresponding with the thickness of the core or hub member and also of the rim member as will be observed by reference to Figure 3 of the drawings.

Having thus described the invention, what I claim is:—

1. A vehicle wheel having radially spaced hub and rim members, said hub member having kerfs, springs seated snugly and for a substantial part of their length in said kerfs, and said springs projecting beyond the last mentioned member to engage the other member and being arranged on curves substantially tangential to the periphery of the hub member.

2. A vehicle wheel having radially spaced hub and rim members, the hub member having kerfs, springs seated snugly and for a substantial part of their length in said kerfs, said springs at their inner ends having rolls, the kerfs being enlarged to accommodate said rolls, said springs projecting beyond the periphery of the hub member and arranged on curves substantially tangential to the periphery of the hub member and engaging the rim member at their free ends, side plates overlapping said hub member and springs and rim, and bolts passing through said side plates and rim.

3. A vehicle wheel having radially spaced hub and rim members, the hub member having kerfs, springs seated snugly and for a substantial part of their length in said kerfs, and said springs at their inner ends having rolls, the kerfs being enlarged to accommodate said rolls, said springs projecting beyond the periphery of the hub member and arranged on curves substantially tangential to the periphery of the hub member and engaging the rim member at their free ends, side plates overlapping said hub member and springs and rim, and bolts passing through said side plates and rim, hub plates disposed against said side plates, bolts passing through said hub, side plates and hub plates, the side plates having openings therethrough enlarged with respect to the last mentioned bolt through which they pass, and said hub plates being disposed in constant closing relation to said recesses.

In testimony whereof I affix my signature in presence of two witnesses.

THOMAS A. BOYER.

Witnesses:
C. H. LEONARD,
C. E. THOMPSON.